United States Patent [19]

Mullin

[11] 4,079,261
[45] Mar. 14, 1978

[54] DETECTOR FOR DISTINGUISHING BETWEEN RECORDED AND UNRECORDED BANDS OF A PHONOGRAPH RECORD

[75] Inventor: John T. Mullin, Santa Barbara, Calif.

[73] Assignee: Minnesota Mining and Manufacturing Company, St. Paul, Minn.

[21] Appl. No.: 715,317

[22] Filed: Aug. 18, 1976

[51] Int. Cl.² .............................................. G06K 7/10
[52] U.S. Cl. ............................ 250/570; 179/100.3 V; 250/239
[58] Field of Search .................. 250/570, 231, 239; 274/15 R; 179/100.3 V, 100.4 D

[56] References Cited
U.S. PATENT DOCUMENTS

| | | | |
|---|---|---|---|
| 1,917,003 | 7/1933 | Williams | 179/100.3 V |
| 2,952,464 | 9/1960 | Stimler | 179/100.4 D |
| 3,368,080 | 2/1968 | Nakagiri et al. | 179/100.4 D |
| 3,937,903 | 2/1976 | Osann | 274/15 R |
| 3,979,588 | 9/1976 | Park | 250/570 |

*Primary Examiner*—David C. Nelms
*Attorney, Agent, or Firm*—Cruzan Alexander; Donald M. Sell; Robert L. Marben

[57] ABSTRACT

A detector for scanning the surface of a record on a phonograph turntable to distinguish between recorded and unrecorded bands by detecting physical differences on the record surface. The detector illuminates a portion of the record surface and senses light reflected from such portion with a photoelectric cell. The portion of the record surface from which reflected light is detected is accurately controlled for reliable operation by a lens that focuses such reflected light at and through an aperture. The lens is fixedly mounted a first predetermined distance from the aperture and maintained a second predetermined distance from such portion of the record surface by a wheel that rides on the record surface.

14 Claims, 8 Drawing Figures

DETECTOR FOR DISTINGUISHING BETWEEN RECORDED AND UNRECORDED BANDS OF A PHONOGRAPH RECORD

BACKGROUND OF THE INVENTION

1. Field of the Invention

The present invention relates in general to phonograph record turntables, and more particularly to a detector for distinguishing between recorded and unrecorded portions of a record carried on the turntable. Such a detector has application in an automatic tune selection apparatus that detects and initiates reproduction of a desired recorded band from among a plurality of recorded bands on the phonograph record surface.

2. Description of the Prior Art

U.S. Pat. No. 2,952,464, issued to Stimler, describes a detector located on the tone arm of a phonograph for sensing the difference in amplitude of light reflected from areas of the record surface as the tone arm scans above the record. Such detector utilizes a light projector and a first lens to form a converging beam of light that illuminates a portion of the record surface, and then utilizes a second lens to focus light reflected from the record surface onto a photoelectric cell. While such a detector focuses light from the record surface onto a photocell, as a practical matter light reflected from records having differing thickness, material composition, manufacturing tolerances and warping cannot be detected with the accuracy desired to provide a reliable detector.

Nakagiri, U.S. Pat. No. 3,368,080, recognizes the shortcomings of Stimler and attempts to solve the problem with a detector utilizing parallel light beam illumination of the record surface and having no lens in the reflected light path. However, a good parallel light beam source at reasonable cost is impractical. Therefore, Nakagiri added to the reflected light path a thick dual parallel slit mask in conjunction with dual differential photocells and a Schmitt trigger circuit.

SUMMARY OF THE INVENTION

The present invention provides a simple and highly reliable detector for distinguishing between recorded and unrecorded portions on the surface of a phonograph record.

A detector according to the present invention, like the prior art (Stimler), has a means for illuminating a portion of the record surface, a means for sensing light reflected from that portion of the record surface and a means for focusing such reflected light toward the sensing means. Unlike the prior art, the present invention has an aperture means between the focusing means and the sensing means, with such aperture being a first predetermined distance from the focusing means; and a means contacting the record surface for maintaining the focusing means at a second predetermined distance from the record surface. Thus, the light reflected from a portion of the record surface is accurately focused at (and through) the aperture opening to provide reliable detection of records having various thicknesses, manufacturing tolerances, and various degrees of warping which even the finest quality records develop.

In the embodiments disclosed, the means for illuminating a portion of the record surface is a lamp, the means for sensing light reflected from the record surface is a photoelectric cell, the means for focusing reflected light toward the sensing means is a lens and the means contacting the record surface is a rotatable wheel.

In a first preferred embodiment, light reflected from flat surface portions (land areas) of the record surface is focused by the lens at (and through) the aperture and upon the photoelectric cell.

In a second preferred embodiment, light reflected from groove walls of the record surface is focused by the lens at (and through) the aperture and upon the photoelectric cell.

DETAILED DESCRIPTION OF THE INVENTION

Figure 1:
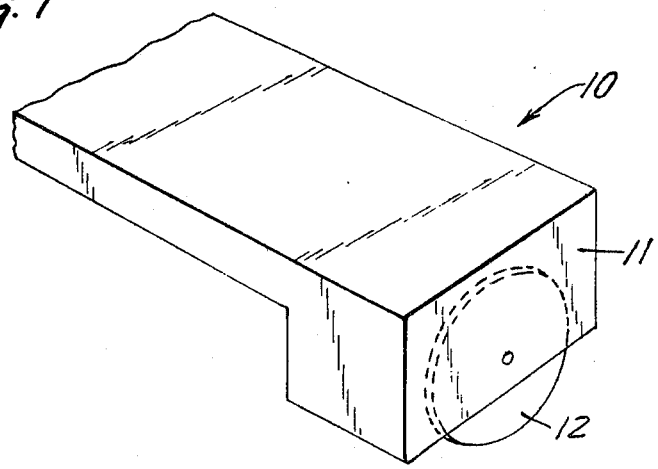
FIG. 1 is a perspective view of a first embodiment of a detector according to the present invention.
Figure 2:
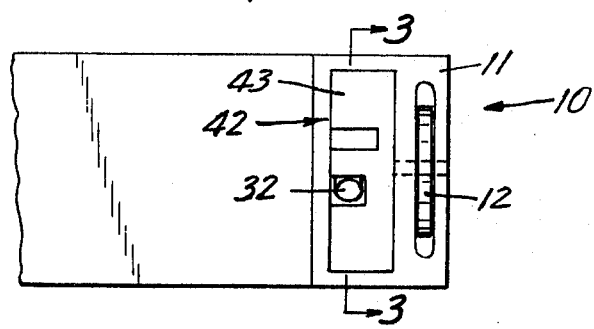
FIG. 2 is a bottom plan view of the detector of FIG. 1.
Figure 3:
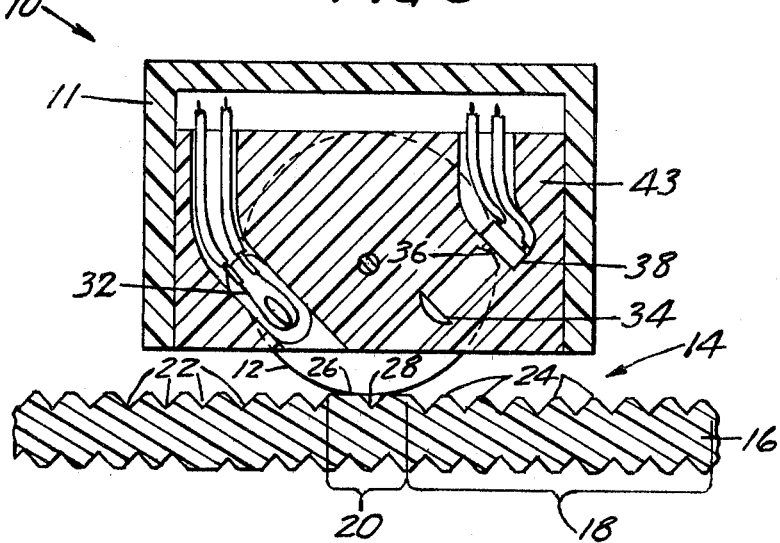
FIG. 3 is a sectional view taken approximately along the line 3—3 of FIG. 2 that illustrates the relationship between the detector of FIG. 1 and a cross section of a phonograph record.

A detector 10 representing a first embodiment according to the present invention is shown in FIGS. 1, 2 and 3. The detector 10 includes a housing 11 having a wheel 12 mounted thereon for riding on a broad surface 14 of a phonograph record 16 as shown in cross section in FIG. 3.

The surface 14 typically comprises an alternating sequence of generally concentric recorded bands 18 and unrecorded bands 20. A recessed, continuous spiral groove passes through such recorded and unrecorded bands. A recorded band 18 typically comprises several generally concentric modulated recording grooves 22 which are separated by flat surface or land areas 24. An unrecorded band 20 typically comprises flat surface or land areas 26 through which an unmodulated groove 28 passes. Within any given record the spacing between grooves (land area surface density) in an unrecorded band 20 is greater than the spacing between grooves (land area surface density) in a recorded band 18. However, the spacing between grooves in an unrecorded band of one record can be smaller than the spacing between grooves in a recorded band on a different record; thus, it is desirable for a detector capable of use with various types of records to make a relative detection based upon the particular record, as further described later.

Briefly, the detector 10 includes a lamp 32 that illuminates a portion of the surface 14 of the record 16. Light reflected from such portion is focused by a lens 34 at and through an aperture 36 and upon a photoelectric cell 38. The lens 34 is mounted at a first predetermined distance from the aperture 36 and maintained at a second predetermined distance from such portion of the record surface by the wheel 12 to provide accurate detection. The photoelectric cell 38 senses light reflected from the land areas 24 and 26 with increased light sensed when scanning the unrecorded bands 20. The photoelectric cell provides an electrical signal output that is processed by electronics including a high pass filter, an amplifier, a back-biasing circuit and a comparator to yield an indication whenever an unrecorded band 20 is scanned by the detector 10.

The detector 10 includes a subassembly 42 that is carried by the housing 11. The subassembly 42 includes a support element 43 in which the lamp 32, lens 34 and photocell 38 are mounted, and the support element 43 is formed to provide the aperture 36.

The lamp 32 or means for illuminating illuminates at least the portion of the record surface from which it is desired to detect reflected light. Light from the lamp 32 striking the land areas 24 or 26 of the broad surface 14 is reflected toward the focusing means such as the lens 34. The lens 34 is mounted in the support element 43 at a first predetermined distance from the aperture 36 and focuses light reflected from the desired portion of the record surface at and through the aperture 36 and upon a means for sensing light such as the photocell 38. The photocell 38 provides an electrical output in response to the light it senses. The illuminating means (lamp 32) and focusing means (lens 34) are located on opposite sides of the normal direction to the broad surface 14 at approximately equal angles from such normal direction to provide for detection of light reflected from the land areas 24 and 26.

The detector 10, including the housing 11 and the subassembly 42 mounted therein, is maintained a predetermined distance from the surface 14 by the rotatable wheel 12 mounted on the housing 11. The wheel 12 provides a means contacting the record surface for maintaining the lens 34 at a second predetermined distance from the desired portion of the record surface 14. Thus, light reflected from such portion is accurately focused at and through the aperture 36 and detected by the photoelectric cell 38.

Figure 4:
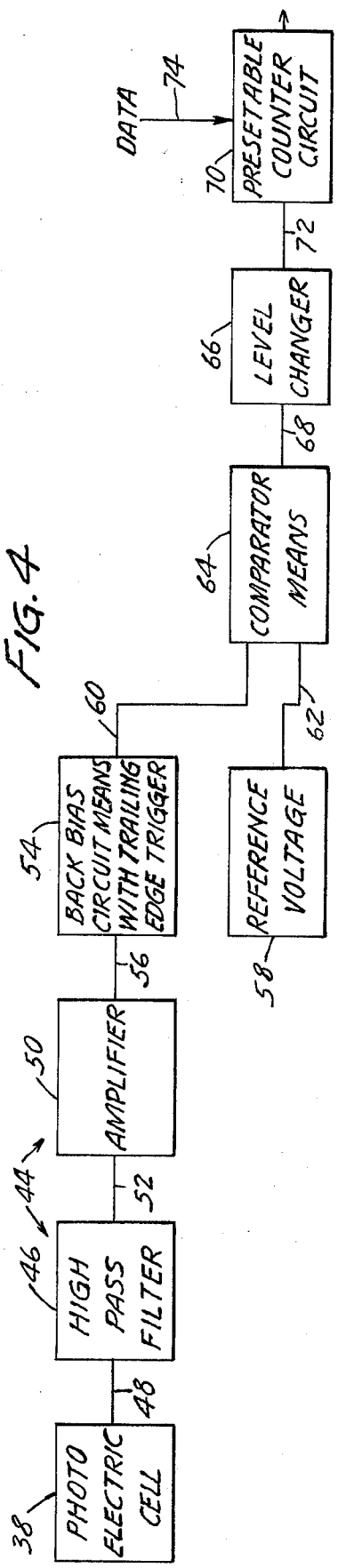
FIG. 4 is a block diagram of electrical circuitry for processing signals from the detector of FIG. 1.

FIG. 4 shows in block diagram form the electronics for processing the output of the photoelectric cell 38 to provide an indication whenever an unrecorded band 20 is scanned by the detector 10. The output of the photoelectric cell 38, which increases in voltage in response to the detection of increased light, is fed to an amplifier means 44 which amplifies the output of photoelectric cell 38. The amplifier means 44 includes a high pass filter 46 operatively connected to the photoelectric cell 38 via conductor 48 and an amplifier 50 operatively connected to the output of the filter 46 via conductor 52.

The high pass filter 46 blocks undesired direct current and low frequency output of the photoelectric cell 38. Such undesired outputs can result, for example, from changes in the intensity of light from lamp 32 due to changes in ambient temperature or current through the lamp, changes in the reflectivity of the record surface due to the material from which the particular record is made, changes in the output of the photoelectric cell 38 due to ambient temperature changes, and changes in the ambient light level within the surrounding environment. The high pass filter 46 also blocks direct current and low frequency outputs of the cell 38 to establish a baseline corresponding to the land area surface density (spacing between grooves) of the particular record being scanned. Thus, the output of the high pass filter represents the magnitude of the high frequency output of the cell 38 from such baseline. Because detection is made relative to a baseline (based on high frequency changes from a baseline) for a particular record, the same detector can successfully be used on a wide variety of records in spite of the fact that the spacings between grooves in an unrecorded band of one record can be smaller than the spacing between grooves in a recorded band on a different record.

The amplifier 50 receives the output of the high pass filter 46 and operates at high gain without saturation due to the blocking action of the filter 46. Amplifier 50 of amplifier means 44 outputs a positive pulse whenever an unrecorded band 20 is scanned.

The output of the amplifier means 44 is input to backbiasing circuit means 54 via conductor 56. Circuit 54 provides a negative-going output pulse on the trailing edge of a positive pulse from amplifier 50. Circuit 54 has a back-biasing feature that provides a positive D.C. level upon which the negative-going output pulse is superimposed, the magnitude of such D.C. level being responsive to pulses from amplifier 50. For example, when the detector 10 scans a record having land areas 24 within a recorded band 18 that vary significantly with respect to each other (due to loud and soft passages for example), amplifier 50 will output a sequence of pulses of relatively small magnitude in response to such variance within the recorded band. In response to such pulses circuit 54 will provide a positive D.C. level such that pulses from amplifier 50 of small magnitude will not produce a pulse having a large negative voltage at the output of circuit 54. However, a pulse from amplifier 50 in response to an unrecorded band will be larger in magnitude and will produce a pulse having a large negative voltage at the output of circuit 54 even though the positive D.C. bias is present.

The output of back-biasing circuit means 54 and the output of a negative D.C. reference voltage 58 are input respectively via conductors 60 and 62 to a comparator means 64. The output of comparator means 64 has two states which are determined by the relative magnitudes of the inputs on the conductors 60 and 62. Thus, the output of comparator means 64 momentarily changes state in response to each output pulse of sufficient negative magnitude from circuit 54, which change of state indicates an unrecorded band has been scanned over by the detector 10.

The output of comparator means 64 is input to level changer 66 via conductor 68. Level changer 66 converts the momentary change of state of comparator circuit 64 into a TTL logic level pulse.

The output of level changer 66 is input to a presetable counter circuit 70 via conductor 72. Counter circuit 70 is preset by data input via conductor 74, which data represents the recorded band at which it is desired to start phonograph record reproduction. Each time an unrecorded band is scanned by the detector 10, counter circuit 70 receives a pulse via conductor 72. Counter circuit 70 indicates when the appropriate number of unrecorded bands have been scanned.

The detector 10 and its associated electronics have been described in functional language and the following details are added to complete the disclosure. With reference to the detector 10, the lamp 32 is a standard light bulb, the lens 34 is a plexiglass half-cylindrical lens, and both are mounted at approximately 45° from the normal direction to the broad surface 14. The aperture 36 is formed in the support element 43 of the subassembly 42 and is 0.010 inch (0.25 mm) by 0.250 inch (6.35 mm). Light reflected from a portion of the record surface 0.014 inch (0.36 mm) by 0.465 inch (11.8 mm) is focused upon and passes through the aperture 36 to be detected by the photocell 38 which is located behind the aperture. The lens 34 is a first predetermined distance from the aperture 36, a second predetermined distance from the portion of the record surface from which light is being detected, and has a focal length $$= \frac{\text{(first predetermined distance) (second predetermined distance)}}{\text{(first predetermined distance)} + \text{(second predetermined distance)}}$$

In the embodiment disclosed, the first predetermined distance and the second predetermined distance are equal. The wheel is made of nylon and has a diameter of approximately 0.5 inch (12.7 mm) so that it will ride on the broad surface 14 without being displaced by the grooves.

Figure 5:
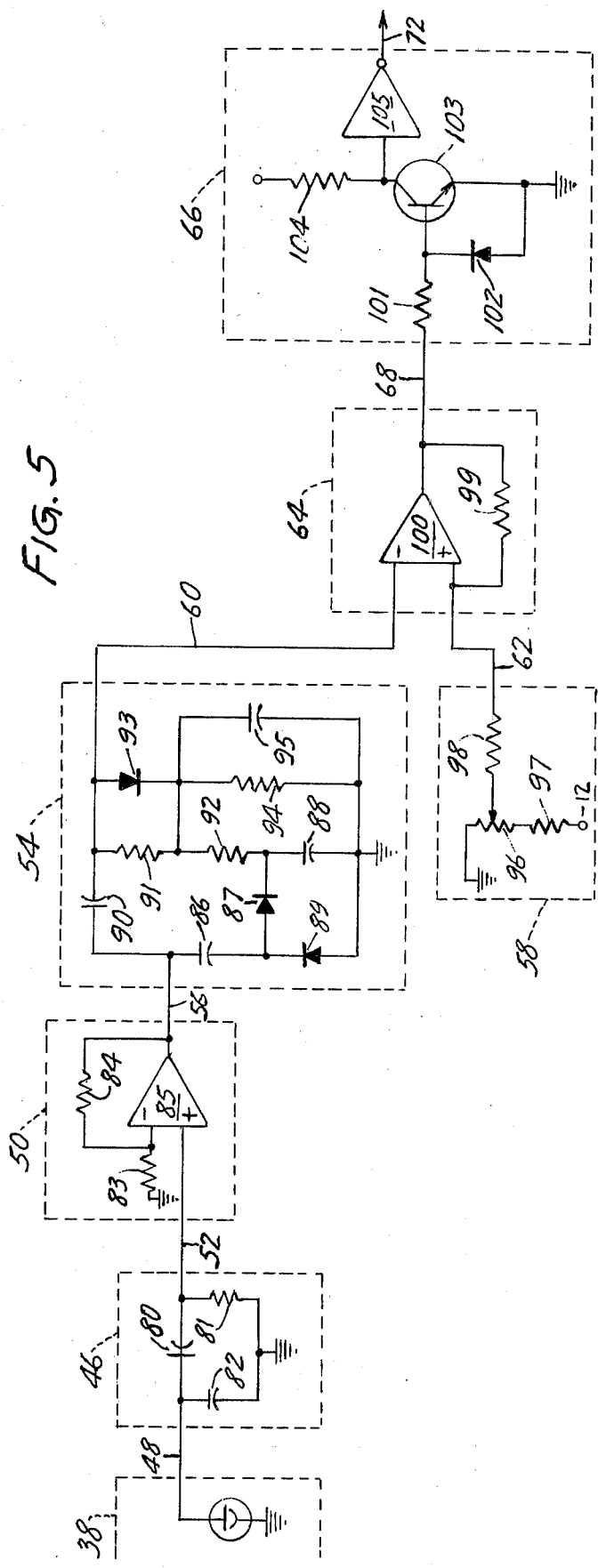
FIG. 5 is a circuit diagram for the pertinent blocks of FIG. 4.

With respect to the electronics, FIG. 5 shows an exemplary detailed schematic for the pertinent electronic blocks of FIG. 4. The high pass filter 46 is formed by capacitor 80 and resistor 81, with capacitor 82 provided to suppress high frequency noise transients. The back-biasing circuit means 54 contains capacitors 88 and 95 which are charged by the positive output pulses of amplifier 50 such that capacitor 95 provides the D.C. reference level at the output of circuit 54. Capacitor 90 and resistor 91 provide the trailing edge triggering pulse that is superimposed on such D.C. reference level.

The following list of parts for the exemplary circuits of FIG. 5 may be utilized:

| Resistors | |
| --- | --- |
| 83 | 100 ohm |
| 101,104 | 1K |
| 84 | 1.5K |
| 97,98 | 10K |
| 81 | 39K |
| 92 | 150K |
| 99 | 180K |
| 91,94 | 1M |
| Photoelectric Cell | |
| 38 | National NSL-701 |
| Capacitors | |
| 82 | .01 uf |
| 90 | .056 uf |
| 80,95 | .33 uf |
| 88 | 1 uf |
| 86 | 27 uf |
| Diodes | |
| 87,89,93,102 | 1N914 |
| Potentiometer | |
| 96 | 100K ohm |
| Amplifiers | |
| 85,100 | UA 741 |
| Logic Gate | |
| 105 | SN 7404 |
| Transistor | |
| 103 | 2N3405 |

The detector 10 is, for example, used on a phonograph having dual parallel arms that move as a unit with the arms positioned a fixed distance apart. One such arm carries the reproduction stylus and the other such arm carries the detector 10. The lengths of such dual parallel arms are positioned tangentially with respect to the grooves on the record and the longer dimension of the aperture 36 is also positioned tangentially with respect to the grooves on the record. Operationally, the arm on which the detector 10 is mounted is lowered so that the wheel 12 is brought into contact with the outer edge of the surface 14 of the record 16 on the turntable which is not moving. The detector 10 scans the record with the wheel 12 riding on the surface 14. When the appropriate number of unrecorded bands have been detected, the detector 10 is raised out of contact with the record surface and the phonograph turntable is started. The arm carrying the reproduction stylus, which has advanced with the arm carrying the detector 10, is advanced the fixed distance the dual parallel arms are apart and then lowered to the record surface to begin reproduction. The detector 10 can, if desired, be located on the same arm with the reproduction stylus. However, under such circumstances, at least one of the reproduction stylus and the detector 10 must be retractable (relatively speaking) such that the stylus and the detector can nonsimultaneously contact the record.

Figure 7:
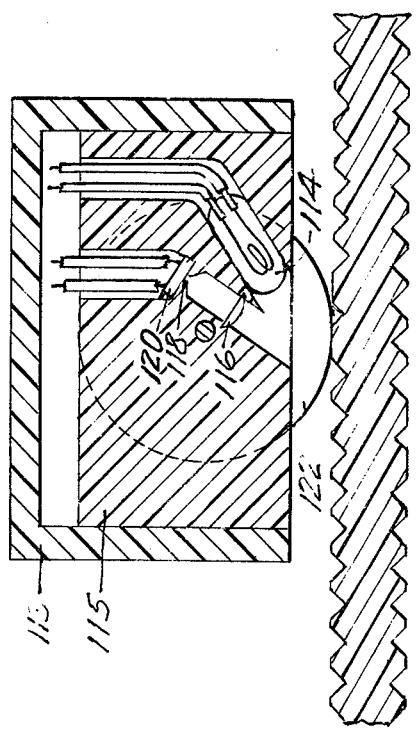
FIG. 7 is a sectional view taken approximately along the line 7—7 of FIG. 6 that illustrates the relationship between the detector of FIG. 6 and a cross section of a phonograph record.
Figure 6:
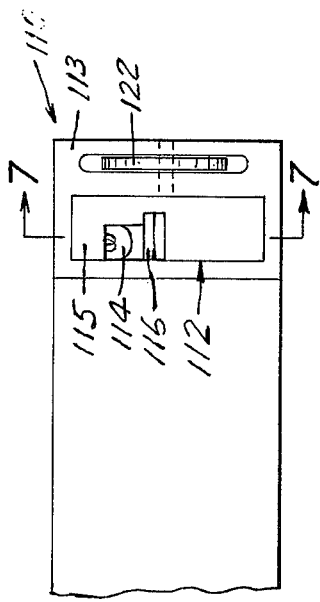
FIG. 6 is a bottom plan view of a second embodiment of a detector according to the present invention.

FIGS. 6 and 7 show a detector 110 that represents an alternate embodiment according to the present invention. The detector 110 includes a subassembly 112 that is received in a housing 113 of the detector 110. The subassembly 112 includes a support element 115 in which a lamp 114, a lens 116 and a photoelectric cell 120, each similar to those previously described, are mounted, and the support element 115 is formed to provide an aperture 118. The detector 110 is spaced from the record surface by a wheel 122 mounted on the housing 113 in a manner similar to that previously described. The lamp 114 (illuminating means) and the lens 116 (focusing means) are located on the same side of the normal direction to the broad surface of the record such that light from the lamp 114 that is reflected from a wall of a recording groove within the desired portion of the record surface is detected. In this embodiment the aperture is approximately 0.0005 inch (0.013 mm) by 0.15 inch (3.8 mm) and detects light reflected from individual recording groove walls at it scans across the record surface.

Figure 8:
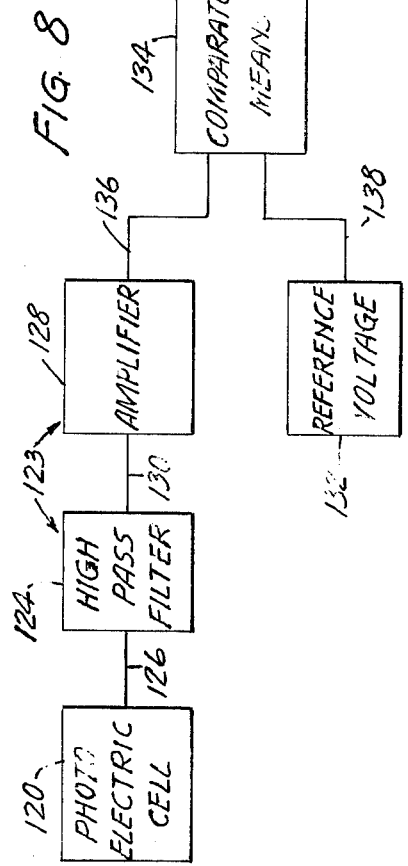
FIG. 8 is a block diagram of electrical circuitry for processing signals from the detector of FIG. 6.

By moving the detector 110 across the record surface at a uniform rate it is possible to detect the spacing between record grooves and hence distinguish recorded bands from unrecorded bands on the surface of the record. FIG. 8 shows a block diagram of electronics for performing such detection. The output of the photoelectric cell 120 is operatively connected to an amplifier means 123 which amplifies the output of photoelectric cell 120. The amplifier means 123 preferably includes a high pass filter 124 that is connected to the output of photoelectric cell 120 via conductor 126 and an amplifier 128 that is connected to the output of the filter 124 by a conductor 130. The output of amplifier means 123 is a pulse waveform whenever a recording groove is detected. The output of amplifier means 123 and the output of a reference voltage 132 are respectively input to a comparator means 134 via conductors 136 and 138. The comparator means 134 momentarily changes state when the output of the amplifier means exceeds an appropriate magnitude to indicate the detection of a recording groove. The output of the comparator means 134 is input to a level changer 140 via conductor 142. The output of level changer 140 is a TTL logic level signal indicating each detected groove and is input to a retriggerable circuit means 114 via conductor 146.

Retriggerable circuit means 144 includes a timing circuit that is retriggered by the output of the comparator means 134 via level changer 140. Retriggerable circuit means 144 compares the time-interval between each pair of detected grooves (each pair of outputs from level changer 140) and a reference time-interval. When the time-interval between detected grooves exceeds the reference time-interval, the circuit means 144 provides an output that indicates the detection of an unrecorded band. Circuit means 144 contains inhibit circuitry for providing only one output indication for each unrecorded band to prevent a groove that crosses such an unrecorded band from initiating two output indications. The reference time-interval may be connected to a second photoelectric cell which broadly detects light from land areas of the record, with the second photoelectric cell being used to vary the reference time-interval to compensate for the situations wherein the spacings between grooves in an unrecorded band of one record can be smaller than the spacing between grooves in a recorded band on a different record. The output of circuit means 114 is input to a presetable counter circuit 148, similar to counter circuit 70.

Detailed circuits for the block diagrams of FIG. 8 are similar to those disclosed in FIG. 5. The retriggerable circuit means 144 is a 74123 retriggerable one-shot type circuit whose output is inhibited for a finite time after the first indication of each unrecorded band to prevent more than one indication per unrecorded band.

What is claimed is:

1. A detector for scanning the broad surface of a record on a phonograph record turntable, wherein recorded bands are distinguished from unrecorded bands by detecting physical differences on the record surface between recorded and unrecorded portions thereof, the broad surface of said record including land areas and recording grooves recessed from said land areas, said detector comprising:
    means for illuminating a portion of the record surface;
    means for sensing light reflected from said portion of the record surface and providing an electrical output in response thereto;
    means having an aperture between said portion of the record surface and said sensing means;
    means positioned between said portion of the record surface and said aperture and at a first predetermined distance from said aperture for focusing light reflected from said portion through said aperture and upon said sensing means; and
    a rotatable wheel for contacting the land areas of the record surface for maintaining the focusing means at a second predetermined distance from said portion of the record surface so that light reflected from said portion is focused at said aperture and detected by said sensing means, said wheel disposed for rotation in response to movement of the detector between the outer and central portion of the record and independent of any movement of the record.

2. A detector according to claim 1, wherein said focusing means comprises a lens.

3. A detector according to claim 1, wherein said sensing means comprises a photoelectric cell.

4. A detector according to claim 1, wherein said illuminating means and said focusing means are located on opposite sides of the normal direction to the broad surface of the record at approximately equal angles from said normal direction to provide for detection of light reflected from the land areas of said portion of the record surface.

5. A detector according to claim 4, further including amplifier means operatively connected to the electrical output of said sensing means, said amplifier means including a high pass filter and an amplifier and providing an output in response to the output of said sensing means.

6. A detector according to claim 5, further including comparator means operatively connected to the output of said amplifier means for providing an output when the output of said amplifier means is provided in response to the presence of an unrecorded band at said portion of the record surface.

7. A detector according to claim 5, further including back-biasing circuit means operatively connected to the output of said amplifier means for providing a bias level upon which a signal is superimposed in response to the output of said amplifier means, and comparator means operatively connected to the output of said back-biasing circuit means for providing an output when the output of said back-biasing circuit means is provided in response to the presence of an unrecorded band at said portion of the record surface.

8. A detector according to claim 1, wherein said illuminating means and said focusing means are located on the same side of the normal direction to the broad surface of the record such that said sensing means is adapted for sensing light reflected from a wall of one recording groove within said portion of the record surface.

9. A detector according to claim 8, further including amplifier means operatively connected to the electrical output of said sensing means for providing an output in response to the presence of said recording groove wall within said portion of the record surface.

10. A detector according to claim 9, wherein said amplifier means includes a high pass filter and an amplifier.

11. A detector according to claim 9, further including comparator means operatively connected to the output of said amplifier means for providing an output when the output of said amplifier means is provided in response to said sensing means detecting light reflected from said recording groove wall within said portion of the record surface.

12. A detector according to claim 11, further including retriggerable circuit means operatively connected to the output of said comparator means, said retriggerable circuit means having a timing circuit that is retriggered by the output of said comparator means and providing an output representing the detection of an unrecorded portion.

13. A detector for scanning the broad surface of a record on a phonograph record turntable, wherein recorded bands are distinguished from unrecorded bands by detecting physical differences on the record surface between recorded and unrecorded portions thereof, the broad surface of said record including land areas and recording grooves recessed from said land areas, said detector comprising:
    means for illuminating a portion of the record surface;
    a photoelectric cell for sensing light reflected from land areas of said portion of the record surface and providing an electrical output in response thereto;
    means having an aperture between said portion of the record surface and said photoelectric cell;
    a lens between said portion of the record surface and said aperture for focusing light reflected from said portion through said aperture and upon said photoelectric cell, said lens located a first predetermined distance from said aperture;

a rotatable wheel riding on the land areas of the record surface for maintaining the lens at a second predetermined distance from said portion of the record surface so that light reflected from land areas of said portion is focused by said lens at said aperture and detected by said photoelectric cell, said wheel disposed for rotation in response to movement of the detector between the outer and central portion of the record and independent of any movement of the record; and amplifier means operatively connected to the electrical output of said photoelectric cell, said amplifier means including a high pass filter and an amplifier and providing an output in response to the output of said sensing means.

14. A detector according to claim 13, further including back-biasing circuit means operatively connected to the output of said amplifier means for providing a bias level upon which a signal is superimposed in response to the output of said amplifier means, and comparator means operatively connected to the output of said back-biasing circuit means for providing an output when the output of said back-biasing circuit means is provided in response to the presence of an unrecorded band at said portion of the record surface.

* * * * *